United States Patent
McGinley et al.

(10) Patent No.: US 12,537,860 B2
(45) Date of Patent: Jan. 27, 2026

(54) RESOURCE ADAPTIVE COMMUNICATION PROTOCOLS

(71) Applicant: Raytheon BBN Technologies, Corp., Cambridge, MA (US)

(72) Inventors: Thomas O. McGinley, Portsmouth, RI (US); Colin Fumito Funai, Lincolnwood, IL (US); Guevara Noubir, Brookline, MA (US)

(73) Assignee: RTX BBN TECHNOLOGIES, INC., Cambridge, MA (US)

( * ) Notice: Subject to any disclaimer, the term of this patent is extended or adjusted under 35 U.S.C. 154(b) by 235 days.

(21) Appl. No.: 18/456,431

(22) Filed: Aug. 25, 2023

(65) Prior Publication Data
US 2024/0073253 A1 Feb. 29, 2024

Related U.S. Application Data

(60) Provisional application No. 63/401,503, filed on Aug. 26, 2022.

(51) Int. Cl.
*H04L 9/40* (2022.01)
*H04L 9/06* (2006.01)
*H04L 9/32* (2006.01)

(52) U.S. Cl.
CPC .......... *H04L 63/205* (2013.01); *H04L 9/0618* (2013.01); *H04L 9/3226* (2013.01); *H04L 9/3242* (2013.01)

(58) Field of Classification Search
CPC ... H04L 63/205; H04L 9/0618; H04L 9/3226; H04L 9/3242; H04L 9/0643; H04L 63/0428; H04L 63/105; G06V 10/25
See application file for complete search history.

(56) References Cited

U.S. PATENT DOCUMENTS

| | | | |
|---|---|---|---|
| 8,677,475 B2 * | 3/2014 | King | H04L 9/088 713/151 |
| 8,745,185 B1 * | 6/2014 | Salo | H04L 63/06 709/223 |
| 8,776,249 B1 * | 7/2014 | Margolin | H04L 63/0471 380/42 |
| 2008/0222414 A1 | 9/2008 | Wang et al. | |

(Continued)

OTHER PUBLICATIONS

Chabanne, et al.,"Privacy-Preserving Classification on Deep Neural Network.," IACR Cryptology ePrint Archive, vol. 2017, p. 35, 2017, 18 pages.

(Continued)

*Primary Examiner* — J. Brant Murphy
(74) *Attorney, Agent, or Firm* — CANTOR COLBURN LLP

(57) ABSTRACT

A technology is described for applying security to a message to be sent over a constrained bandwidth link. The method may include identifying a priority portion of the message, using machine learning, that is to be sent with increased security as compared with a remainder of the message. A level of security to be applied to the priority portion of the message may be determined. A security protocol may be applied to the priority portion of the message, as defined in part by the level of security. The data packets may be sent for the message across the constrained bandwidth link to a receiving node.

17 Claims, 11 Drawing Sheets

(56) References Cited

U.S. PATENT DOCUMENTS

| | | |
|---|---|---|
| 2009/0185677 A1 | 7/2009 | Bugbee |
| 2015/0006899 A1 | 1/2015 | Seo et al. |
| 2015/0271225 A1* | 9/2015 | Mao .................. H04L 65/764 |
| | | 709/219 |
| 2018/0082074 A1* | 3/2018 | Nunes .................. G06F 21/608 |
| 2019/0387199 A1* | 12/2019 | Martinez-Heath .... H04L 63/105 |
| 2020/0077240 A1* | 3/2020 | Bansal .................. H04W 84/18 |
| 2020/0162516 A1* | 5/2020 | Israel .................. G06F 21/566 |
| 2021/0027195 A1* | 1/2021 | Alakuijala ............. G06N 20/00 |
| 2021/0271934 A1* | 9/2021 | White .................. G06N 3/045 |
| 2022/0207274 A1* | 6/2022 | Folkens ................ G06V 20/47 |
| 2023/0177795 A1* | 6/2023 | Klement ............... G06V 10/25 |
| | | 382/103 |
| 2024/0013237 A1* | 1/2024 | Folkens ................ G06V 10/44 |
| 2024/0073025 A1 | 2/2024 | Mcginley et al. |

OTHER PUBLICATIONS

R. Gilad-Bachrach, N. Dowlin, K. Laine, K. Lauter, M. Naehrig, and J. Wernsing, "Cryptonets: Applying neural networks to encrypted data with high throughput and accuracy," in International Conference on Machine Learning, pp. 201-210, 2016.

* cited by examiner $$K_{ec} = KDF(K, ec),$$

$$m_0 = \text{MAC}_t(K_{ec}, 0, d_1, m_1)$$
$$d_1, m_1 = \text{MAC}_t(K_{ec}, 1, d_1, d_2, m_2)$$
$$d_2, m_2 = \text{MAC}_t(K_{ec}, 2, d_1, d_2, d_3, m_3)$$
$$\vdots$$
$$d_i, m_i = \text{MAC}_t(K_{ec}, i, d_1, \cdots, d_{i+1}, m_{i+1})$$
$$\vdots$$
$$d_{n-1}, m_{n-1} = \text{MAC}_t(K_{ec}, n, d_1, \cdots, d_n, M_{ec})$$
$$d_n, M_{ec} = \text{MAC}_t(K, ec, d_1, \cdots, d_n)$$

RESOURCE ADAPTIVE COMMUNICATION PROTOCOLS

CLAIM OF PRIORITY

This application claims the benefit of Provisional Patent Application Ser. No. 63/401,503, filed on Aug. 26, 2022, entitled "Resource Adaptive Security Protocol and IA Framework for Heterogeneous Networks (RASPIAN)" which is incorporated by reference in its entirety herein.

BACKGROUND

Next generation communication applications used in extreme environments (e.g., underwater environments, mines, deep deserts, remote jungles, polar caps, war zones, etc.) may involve heterogeneous networks (HetNets) to deliver information to the right user at the right time in the desired location. Existing network security standards provide provably secure messaging for network users but with an overhead cost to the communications being sent.

In the past, when any security is desired for data sent over a computer network or the internet, the default for sending the data is to send the data with the highest possible security. As a result, IPSec (IP Security or Internet Protocol Security) or other security protocols (e.g., TLS or HTTPS) are frequently applied to data to provide a high level of security. The application of IPSec may be considered an all or nothing approach and may provide complete security for the data or data blocks being sent. However, there is bandwidth overhead that consumes a portion of the transmission bandwidth of the communication link when IPSec is used.

When a higher bandwidth connection is being used, the amount of overhead used for security of the data as compared to the amount of bandwidth available means that communications are not likely to be significantly impacted. However, in the case of lower bandwidth connections or constrained communication links, then the amount of data overhead incurred by IPSec or other communication security protocols becomes proportionally greater. In some cases, this additional overhead may too great for the communication link to continue operating properly. For example, underwater acoustic links may operate at only at hundreds of bits per second. Similarly, low probability to intercept or detect (LPI/D) communication links often use lower bandwidth rates to avoid detection. Even in the case of radio frequency RF communication links, there may be a trade-off between providing a lower probability of detection and overall throughput. In RF communication links, the use of a spreading factor may create a lower overall throughput, and any protocol where a higher spreading factor is used may be bandwidth constrained.

A low bandwidth or large delay communications link, such as an underwater acoustic modem or a communication link with Low Probability to Intercept/Detect (LPI/D) parameters, may not be able to use IPSec because of the overhead IPSec imposes on the data blocks and data packets being sent. The inflexible "all or nothing" approach of IPSec and similar security protocols in previously available communication systems may make a constrained communication link unusable for secure communications, even in a life-or-death situation, such as on the battlefield or in a submarine.

DETAILED DESCRIPTION

Figure 1:
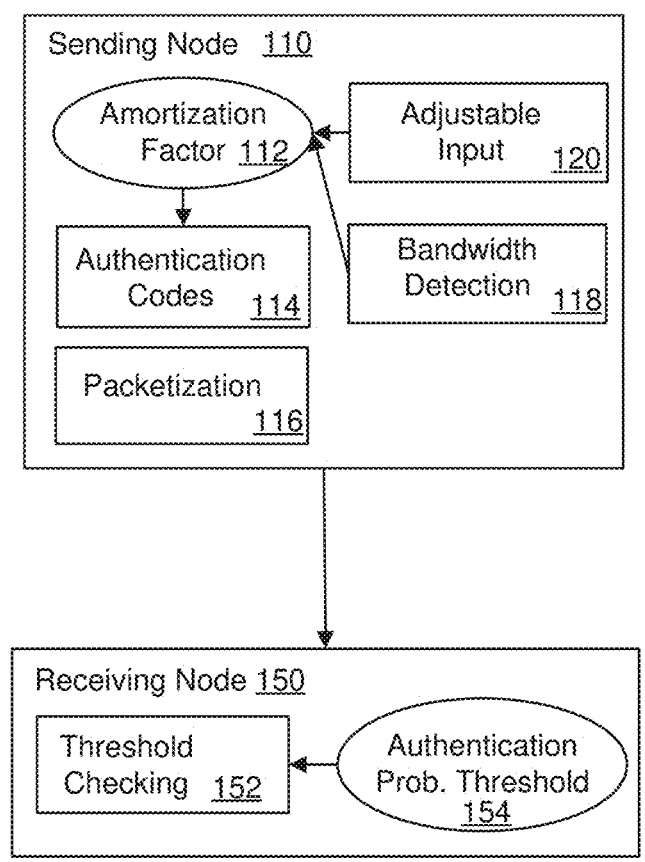
FIG. 1 is a block diagram illustrating an example of a system for applying authentication on a constrained bandwidth link.

Reference will now be made to the examples illustrated in the drawings, and specific language will be used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

The present technology may provide adaptive security, an authentication protocol and/or a communication architecture for heterogeneous and/or bandwidth constrained networks. The term bandwidth constrained network may be defined as a communication network that has factors or orders of magnitude less bandwidth than widely available levels of bandwidth on other networks. This adaptable framework can provide probabilistic security and authentication methods to match underlying link constraints and desired user service requirements. Low overhead security when using the constrained bandwidth link may also be provided. A plurality of communication protocol adaptations may be supplied to tailor the security and authentication solutions to the constraints of communications links and user specifications for bandwidth constrained networks. The technology may be useful in situations when it is better to receive information that is less than 100% secure rather than not receive the information at all.

In one aspect of the technology, the overhead associated with authentication and/or security can be amortized over time by keeping the amount of authentication information sent with each data blocks low and by spreading the authentication data out over time. This spreading of the authentication data may avoid overloading a constrained bandwidth link with too much authentication information at one time. Truncated authentication codes can be received with data blocks in packets at a receiving node. As more data blocks and truncated authentication codes are received over time, the confidence in the integrity of what has been received from the sending node may increase.

In another aspect, machine learning techniques can be used to identify priority portions of a message in order to apply the highest security and/or compression fidelity to only that priority part (e.g., more important or more relevant part) of the message. Selectively applying security or compression to portions of the message may trade increased computation at the node for reduced data sent using the bandwidth available on the communication link. However, the selective application of encryption or compression may enable secure communications on constrained links where communication might otherwise not occur (or might occur insecurely).

Another adaptive security protocol may be the use of known data and/or shared functional capabilities at the sending and receiving nodes, such as precise time synchronization between sending and receiving nodes to implicitly derive initial values for low overhead encryption. In addition, any data that is known and shared between the sending node and receiving node may also not be sent. This may include redundant data in packet headers (e.g., port numbers for communication) that can be set in advance and are known to both the sending and receiving nodes.

A group of techniques is described that can be selected from and applied to the data or messages to be sent depending which technique is determined to best apply and/or depending on the speed of the constrained bandwidth link. Accordingly, this technology can apply different aspects of security and validation on a constrained bandwidth link but the reduced level of security and validation may allow the intended communication to still take place. The system can adjust the amount of security and authentication that is applied to the data based on the capacity of the constrained bandwidth link or the amount of security a user wants to have. Once one or more of security and authentication techniques are selected then both the sending and receiving nodes may know the agreed on protocol in advance.

This technology also allows for control over a level of security being used, which may be expressed as a desired level of confidence (e.g., an 85% confidence level is desired). In one example, machine learning techniques can be used to identify the priority portions of a message. Then the highest level of security (e.g., encryption) can be applied to those priority portions of the message and less security can be applied to the lower priority portions.

In practice, a user may have an important communication that is desired to be communicated across a constrained bandwidth link. However, the individual also wants to have as much security as possible despite the constrained bandwidth link. Sending data with reduced levels of security is generally better than sending information on a completely open link or not sending any information at all. In contrast, the individual may be not able to communicate at all on the constrained bandwidth link if IPsec were to be used on the link. This is because the security and authentication data would otherwise consume so much of the constrained bandwidth link that very little data or no useful data may be received by the receiving node.

Rather than an all or nothing communication link, the adaptive security protocols can be used to provide a more secure communication link even though there is no guarantee of the highest level of security possible. In the example of communications in a theater of war, the communication may be important enough to send the information at 60% probability of security, and this may be better than not sending the message at all.

Distributed Overhead Progressive Security

One example of technology for low overhead progressive security or progressive authentication will now be described. FIG. 1 is a block diagram of a system illustrating applying an authentication process to data sent across a constrained bandwidth link. A sending node 110 may determine an amortization factor 112 for authentication to be applied to data blocks sent across a constrained bandwidth link. The amortization factor 112 may be a numerical value set between 1 and N (e.g., 1 to 10, 1 to 100, 1 to 1000, etc.) or a percentage value (e.g., 0.05, 0.01, etc.). The amortization value can represent an amount the authentication codes will be spread out over a group of data packets. For example, a value of 10 or 0.1 may indicate that 10% of authentication information needed to validate the message as secure or untampered with may be sent with each data block. In one configuration, the amortization value may be set in advance and the receiving node and the sending node may both know the amortization value in advance.

The sending node 110 may generate truncated authentication codes using an authentication codes service 114, and the truncated authentication codes may be truncated keyed cryptographic checksums for the data blocks. A truncation size of the truncated authentication codes may be defined in part by the amortization factor 112. The truncated authentication codes may be truncated to the N leftmost bits, where N is modified by the amortization factor. For example, N may be 8 bits. A truncated authentication code may have a reduced bit length for a checksum based on at least one current data packet and the next truncated authentication code for the next data packet. The term current data packet may mean the current data packet being hashed by the sending node 110 or received by the receiving node.

The data block and truncated authentication codes may be packetized using a packetization service 116 and sent across a packet switching network (e.g., the internet or a direct link using TCP/IP transmission control protocol/internet protocol). Each network packet may contain one or more data blocks and truncated authentication code pairs. The data packets can be sent across the constrained bandwidth link with the truncated authentication codes to the receiving node 150. In one example, the data blocks and truncated authentication codes can be sent across a point to point network that is not packet switched and the data blocks and truncated authentication code may not be packetized or have packet headers added but may be sent directly without packet addressing.

An authentication probability threshold 154 may be known to the sending and/or receiving node and may represent a number of truncated authentication codes, data bits, data blocks and/or a data amount at which the data blocks being sent across the constrained bandwidth link are deemed to be authentic and unmodified. The threshold checking service 152 on the receiving node may check to see when the authentication probability threshold 154 is reached and the message is determined to be authentic.

In prior authentication schemes, when the integrity of a message is checked, there is an authentication code that is sent with the data (e.g., a certain number of bytes with each data block). An example of such an authentication code may be the message authentication code (MAC) protocol (i.e., message integrity code (MIC)) that is widely used in internet or other networked communications. Using MAC authentication tags that are sent with the data blocks is likely to consume more bandwidth than a constrained bandwidth link can manage (i.e., the end application does not function properly because so little data is received). Accordingly, the authentication code(s) can be amortized across more than one data block. In the protocol described, a portion of the authentication codes can be sent initially and then more of the authentication code are collected over time as more data packets are received.

In one configuration, the amortization value may be adjustable 120. For example, the amortization value may be adjusted on both the sending node and receiving node by a user before the sending node and receiving node are separated by a distance for communication use. The amortization value can be can be increased and then the truncated authentication tags may be spread across more data blocks. For example, if the amortization value is 1 then the number data packets needed before authentication can be verified may be 10 data packets. If the amortization value is 10 or 100 then the truncated authentication codes may be spread across 100 or 1000 data packets, etc. The more the truncated authentication codes are spread out over many data blocks, the more data blocks the receiving node will receive before the receiving node can reach the confidence that no one has tampered with the data blocks that are received.

By comparison, IPSec may generate a full authentication code or authentication tag with each data block and then it is known with a high level of confidence that the data block is authentic. When the authentication codes are spread out over several data blocks then there is less confidence that each individual data block is authentic. The more the data for the authentication codes is spread out, the more data blocks the receiving node may need to collect to have a high level of confidence that the message is authentic. In one example, there may be a communication session that has a high priority message and a reduced amount of bandwidth is available during transmission. In this case, the amortization value may then be increased to increase the speed at which the message is received, but the message may be received with lower levels of confidence until a greater number of truncated authentication codes and data blocks have been accumulated. The amount of authentication applied may be varied depending on the confidence level desired and/or the speed at which a defined confidence level for the authentication is desired to be reached. This enables the consumption of the bandwidth resource for authentication to be managed, as desired, based on: the application, the user's needs, the priority of the message, the available bandwidth, etc.

As discussed earlier, the threshold checking service 152 may determine when this authentication probability threshold 154 has been met. For example, an authentication probability threshold 154 may be reached when a defined number of truncated authentication codes is received with their corresponding data blocks at the receiving node for a message. Accordingly, satisfying the authentication probability threshold 154 indicates the data blocks are authentic and have not been modified or tampered with by a third party. The data blocks may then be marked as authentic to enable a user or application to use the data blocks when the authentication probability threshold 154 has been satisfied. The data blocks from the packets sent over the constrained bandwidth link may then be presented for viewing or use at the receiving node after the data packets are deemed to be authentic. For example, the data blocks may contain an image that is displayed to a user or text information that a user can view or use.

The amortization factor to be applied may be set in advance, received through a user interface control or set based on a detected bandwidth of the constrained bandwidth link using a bandwidth detection service 118. For instance, a first user may enter the amortization factor for the sending node through a graphical user interface (GUI) of the sending node and a second user may enter an amortization factor on the receiving node through the GUI of the receiving node before the communication nodes are separated. Then the shared amortization factor can be used by both communication nodes. Alternatively, the amortization factor entered by a user on the sending node may be encrypted and sent to the receiving node. In another configuration as discussed earlier, an amortization factor to be applied can be determined or set in advance (e.g., at manufacturing time) for both the sending node and receiving node.

In a separate configuration, the constrained bandwidth link of a computer network may be detected between a sending node and a receiving node, across which data blocks in packets are to be sent. The bandwidth available (e.g., N kilobits per second) between the two communication nodes may be detected. If the bandwidth is low enough that using authentication may impede the connection, then the amortization factor may be set or increased to spread the authenticated codes across the data blocks being sent. If the bandwidth available is higher and less constraint may be imposed on the connection by using more of the bandwidth for authentication, then the authentication codes sent may be larger (i.e., less truncated) and sent with fewer data blocks to the receiving node.

Figure 2:
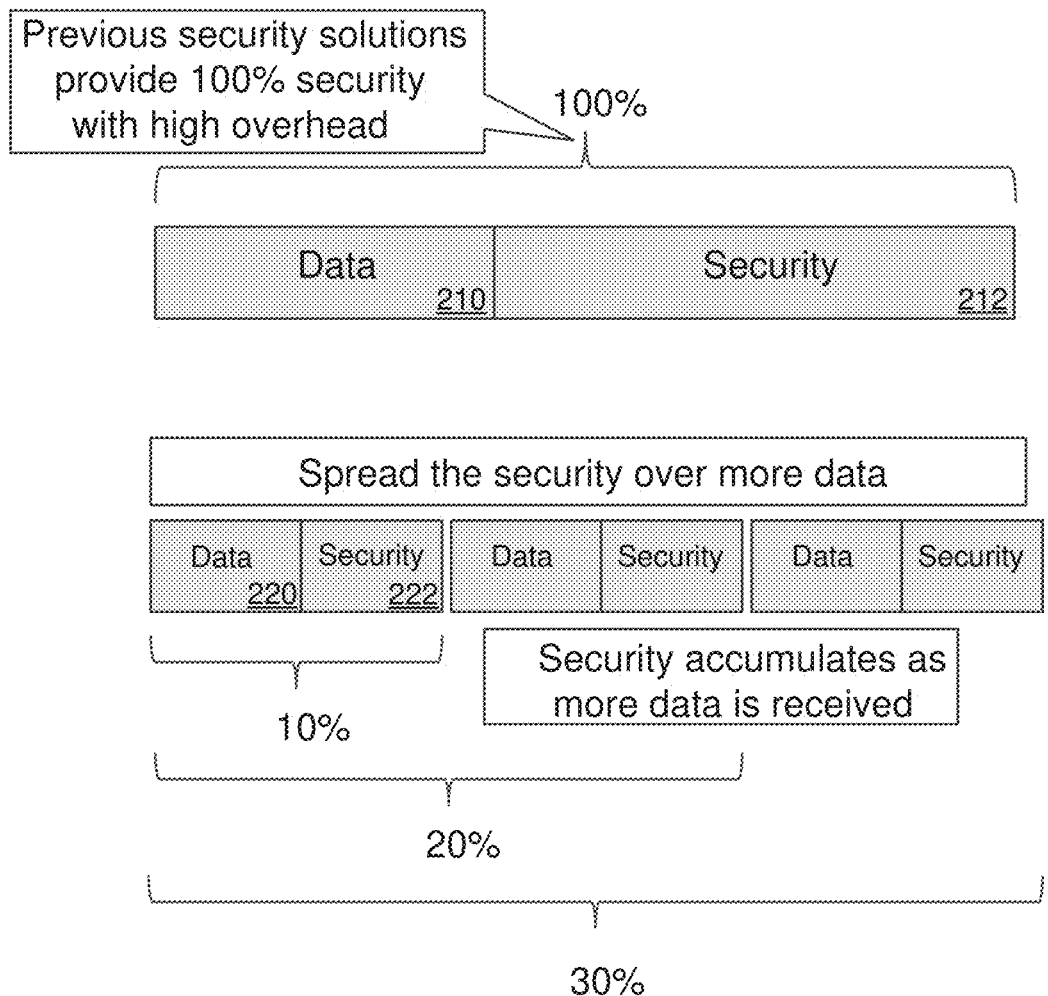
FIG. 2 is a block diagram illustrating an example of the difference between the size of security information sent with a data block in previous systems as compared to the size of security information sent with data blocks in the present system.

FIG. 2 is a block diagram illustrating the difference between the size of security information 210 (i.e., authentication information) sent with a data block 212 in previous systems as compared to the size of security information 220 sent with data blocks 222 in the present system. More specifically, FIG. 2 illustrates that previous security and authentication protocols provide 100% security and authentication while using much larger security information codes and larger data blocks. In the present system, smaller data blocks 220 may be used and the security and authentication data 222 may be spread out over a greater number of data blocks 220. Accordingly, the confidence level for the security and authentication increases as more authentication data 222 and more data blocks 220 are received at a receiving node.

As discussed, integrity for the data can still be provided even when the authentication data is truncated and spread between data blocks. However, a higher level of integrity or the full integrity of the data can be determined after enough of the truncated authentication codes have been received. The level of confidence in the integrity of the data increases progressively as each new authentication code is received over time until a desired level of integrity (e.g., 80% or 90%) is reached.

Figure 3:
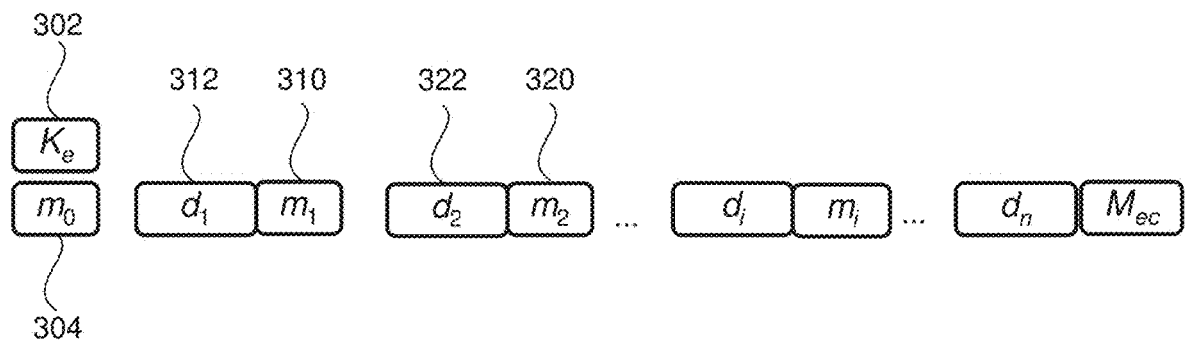
FIG. 3 is a block diagram illustrating an example of data blocks and truncated authentication codes that are received over time by a receiving node.
Figure 4:
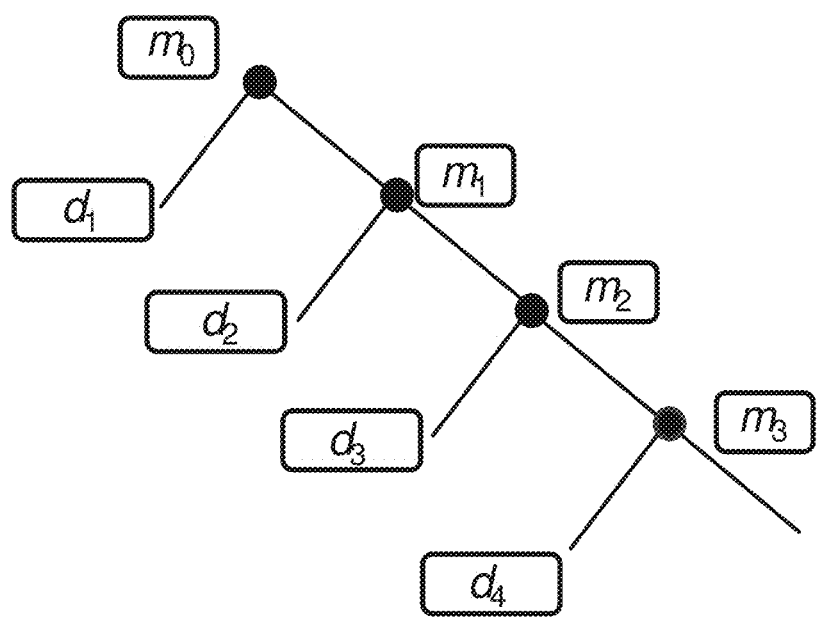
FIG. 4 is a block diagram illustrating an example where truncated authentication codes are generated for data blocks.

FIGS. 3 and 4 illustrate the accumulation of confidence over time as the data blocks and truncated authentication code arrive at a receiving node. FIG. 3 illustrates that an initial truncated authentication code $m_0$ 304 has been generated from the key $K_{ec}$, a counter, the first data block $d_1$, and the next truncated authentication code $m_1$. Another truncated authentication code $m_1$ 310 was generated using the initial data block $d_1$ 310, the next data block $d_2$ 322 and next truncated authentication code 320 $m_2$. This next truncated authentication code $m_1$ 310 may have been sent across the network link with the first data block 312. The second data block 322 and another truncated authentication code $m_2$ 320 was created using the first data block $d_1$ 310, the second data block $d_2$ 322, the third data block $d_3$, and next truncated authentication code $m_3$. The second data block $d_1$ and second authentication code $m_2$ can be received across the network link together. As can be seen in FIG. 3, the pattern for hashing the data blocks in the sending node is to start by hashing all the data blocks together (see $d_n$, $M_{ec}$, where $M_{ec}$ is an authentication code generated at time ec). Then the last data block is removed from the set of data blocks and the new set of data blocks is hashed together along with the last truncated authentication code to incorporate the hash value of the next data block $m_{n-1}$ and so forth. For example, the data blocks may be hashed in reverse order as compared to the received order the data blocks appear in the diagram.

The reduced size of the truncated authentication codes or partial authentication codes means the truncated authentication codes provide a lower level of authentication for each authentication code as compared to receiving a full or untruncated authentication code. However, when a defined number of data blocks and truncated authentication codes is received by the recipient node, then the recipient node will determine that a level of confidence and integrity of data has been reached that is high enough for the defined data to be used. FIG. 4 is a tree diagram illustrating that truncated authentication codes are generated for an accumulated number of data blocks that precede the truncated authentication code.

FIG. 3 further illustrates that this accumulation of truncated authentication codes is occurring over time. The key $K_{ec}$ is not sent to the receiving node but the key is derived using a secure Key Derivation Function from Epoch (ec) (i.e., a shared time function). For example, the message authentication code (MAC) may be a hash-based message authentication code (HMAC) with SHA-256 truncated to 128 bits. The term t in FIG. 3 may be 8 bits and represents the reduced number of bits in the truncated authentication code. A different number of bits may be selected depending the amount of authentication data desired to be received with each data block and/or the amount of bandwidth available. For example, the number of bits in the truncated authentication code may be just a few bits (e.g., 4 or 8 bits) up to an amount approaching a full message authentication code (e.g., 32 bits or 64 bits). Each block of data $|d_i|$ in this example may be 100 bits. In this example, the overhead per data block may be set to less 10% of the size of the data block. An authentication code using the equivalent IPSec overhead and not counting headers is likely to be more than 100% the size of the data block.

As the truncated authentication codes for data blocks are created and truncated, the truncated authentication code includes the truncated authentication code from the previous authentication operation (e.g., hash) and a plurality of data blocks. Progressive integrity is created by receiving more and more of the authentication data that is spread out over the multiple authentication codes. Depending on how many data blocks the truncated authentication is spread across, the time to receive the desired authentication level may be increased or decreased. The receiving node does not have to wait until the end of the message is received because once enough data blocks and truncated authentication codes have been received by the receiving node, then the receiving node may have enough confidence and the received portion of the message may be considered secure. This means the receiving node is accumulating the integrity or authenticity as more data blocks with their truncated authentication codes are received.

A threshold may set as to when enough truncated authentication codes have been received with data blocks to consider the message secure. Once the receiving node has obtained a defined number of data blocks that are provably secure (although at a reduced level for each individual data block) then the message may be considered secure. For example, the threshold may be set to where 60% to 90% of the truncated authentication codes are received to determine the data is authentic. For example, once the data in the truncated authentication codes reaches 60% or 80% of the authentication data that would otherwise be received with a full MAC code, then the message may be deemed valid.

In one example configuration, a GUI (graphical user) interface may be used to control the authentication probability threshold for validation. There may be graphical slider or knob control that can be set on the receiving node and/or the sending node that represents a percentage of the truncated authentication codes to be received to reach in order to validate the message(s). This percentage may be translated from a percentage to a number of integrity bits to be received as compared to receiving a full MAC during communication. At some point, the receiving node has enough bits that the number of bits is the same as what the receiving node would receive with a full MAC applied. By comparison, if 128 bits were sent by IPSec before but now the receiving node is receiving only sending 8 bits per data block, at some point the receiving node will receive at least 128 bits and that this is comparable to using a full MAC or authentication code (e.g., 100% of the validation data is received).

Selective Security

In another embodiment, this technology may use selective security and/or compression to make sure an amount of data is sent across the reduced bandwidth link which will not render the link unusable. Artificial intelligence and/or machine learning techniques may be used for automated detection of priority data within a message. Data with the highest priority in the message may be sent with the higher probabilistic security protocol (e.g., higher overhead encryption) while the lower priority parts of the message can be sent with lower security protocol (e.g., lower overhead). The more important or higher priority data in the message can also be compressed in a way to preserve fidelity, while bandwidth may be saved by compressing the lower priority data in the message at a greater ratio or using lossy compression.

Figure 5:
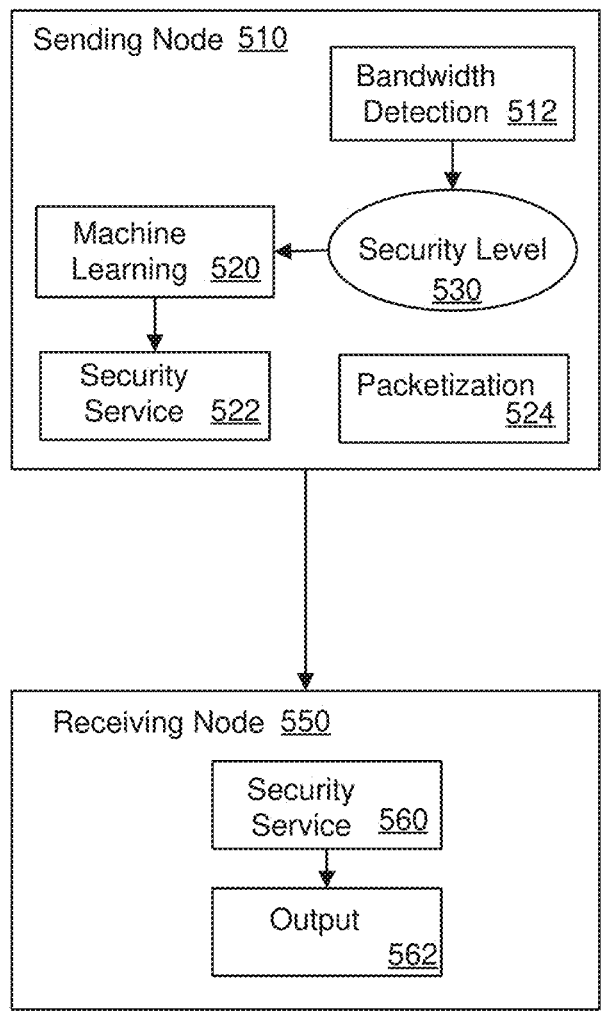
FIG. 5 is a block diagram illustrating an example of technology for applying security to a message to be sent over a constrained bandwidth link.

FIG. 5 is a block diagram illustrating technology for applying security to a message to be sent over a constrained bandwidth link. Selective security and/or compression may be applied to the message. In many messages, there are higher priority parts of the data and lower priority parts of the data. In an example of video images, the video feed may be of a desert scene and the background may be lower priority or not important at all. However, there may be an item of interest, such as an armored vehicle, airplane, animal, person or a pattern that is of interest (and is higher priority) in an image or sequence of images.

A machine learning service 520 may identify a priority portion of the message that is desired to be sent with increased security as compared with a remainder of the message. The machine learning service 520 can identify the desired pattern in the image that the machine learning has been previously trained to identify using a training data set. In one example, a convolutional neural network (CNN) or another type of deep neural network (DNN) can be trained and used to recognize certain patterns. In a more specific example, the You Only Look Once (YOLO), which uses a DCNN (deep convolutional neural network), can be used to detect a bounding box for a desired pattern. Any other type of machine learning, pattern detection, or edge detection process can be used that detects the higher priority portion of the image(s), video, audio, text or other type of messages.

A security level 522 to be applied to the priority portion of the message may also be determined. The security level 522 may be the strength of the encryption to be applied. In one example, the constrained bandwidth link for a computer network across which the data packets are to be sent between a sending node 510 and the receiving node 550 is detected using a bandwidth detection service 512 on the sending node. The security level 530 to be applied to the priority portion of the message may be based in part on a speed of the constrained bandwidth link. When the available bandwidth is lower, then the encryption applied may be weaker (or the compression may be stronger). When the available bandwidth is higher, then the encryption applied may be stronger (and the compression may be weaker). Thus, the priority parts of message or signals (e.g., the important part of the image) may be sent as encrypted data or compressed data.

In the case of compression, applying compression to a lower priority portion of a video or audio message may result in significant loss but that data loss may not be important to the final message. Returning to the example of the desert scene, the remainder of the image outside of the pattern that was recognized may not be a priority for the ultimate message. Accordingly, the lower priority part of the message may be compressed with lossy compression. In contrast, the priority part of the message may have compression applied that provides no loss or relatively little loss.

Applying selective security and/or selective compression to a message may reduce the amount of bandwidth consumed to get important information to a receiving node and end user with some level of security, while saving bandwidth on the transmission of the less important information. Accordingly, a combination of reduced security and compression may be used to get the higher priority part of the data sent across the low bandwidth link in a usable time frame.

The security protocol can be applied by a security service 522 to the priority portion of the message, as defined in part by the level of security determined. The security protocol may be encryption having a defined encryption strength (e.g., as defined by an encryption method or an encryption key size).

In one example, if a constrained bandwidth link is detected or a comparatively low speed of the link is detected, then the security protocol to be applied may be counter mode encryption or block cipher mode encryption. Counter mode encryption can be turned on or off at the nodes as follows: by the nodes themselves, based on the amount of bandwidth available or by the selection of the end users. The selection of counter mode encryption is based on using a form of encryption that has lower overhead and may consume less of the overall communication link's bandwidth. Instead of having the nodes negotiate with one another and then choose an encryption protocol that adds more overhead or cypher text expansion, this lower overhead encryption (i.e., counter mode encryption) or other lower overhead encryption methods can be applied. Synchronized clocks between the sending and receiving nodes can be used to synchronize the counters for counter mode encryption on both nodes. This means the timestamp can be used for the counter mode encryption instead of sending an initialization vector between the communicating nodes.

In another embodiment of counter mode encryption, a pseudo random function may be used instead of a counter that is known to both the sending node and the receiving node. Thus, security may be provided but with a reduced overhead that does not consume so much of the communication links bandwidth that useful communication is not possible across the communication link.

In a further embodiment, a time stamp can be used instead of sending initialization vectors between the sending node and receiving node for generating a symmetric encryption key at each node. The same timestamp can be derived by both the sending node and receiving node where both nodes are time synchronized in advance. The overall amount of bandwidth needed by the communication link can be reduced because the time stamp field does not have to be sent in the situation where both sides have already synchronized their clocks closely enough prior to any communications. Accordingly, the information used to derive the key for both the sending node and receiving node does not need to be sent and this results in less bandwidth used during communications.

Once the security has been applied, the data blocks may be packetized using a packetization service 524 and the data packets may be sent across the constrained bandwidth link to a receiving node 550. The receiving node 550 may decrypt or decompress the data packets using a security service 560 on the receiving node. Then the message received may be presented to an application or user through an output service 562.

Figure 6:
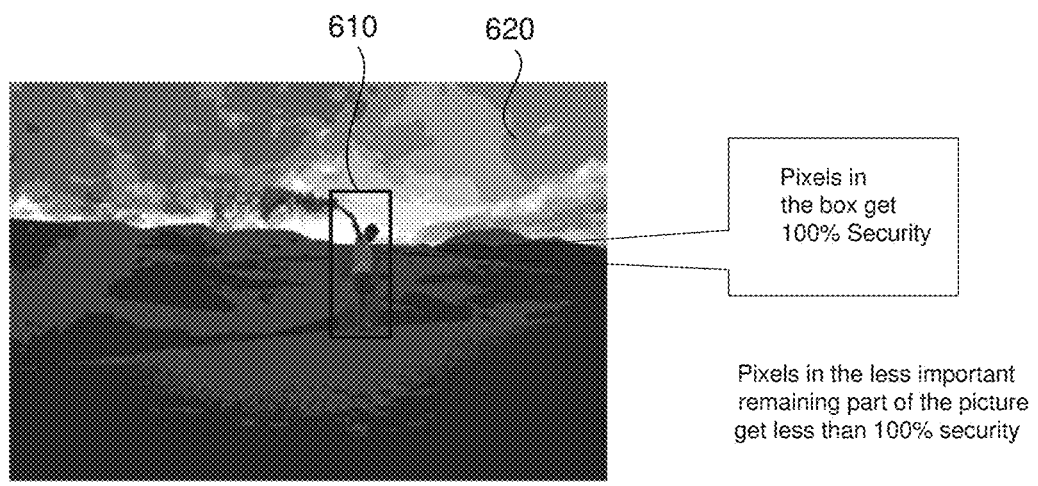
FIG. 6 is a diagram and image illustrating an example where the image may be searched to a find a pattern of interest to be sent with security applied.

The message that is having security applied may be audio, images or video. The message may also be character encoded data that is text, alphanumeric data, numeric values or other character types of data. FIG. 6 is a diagram illustrating an image example where the image may be searched to a find a pattern of interest. In one example, the priority portion of the image may be defined by a geometric shape 610 (e.g., a bounding box) containing a pattern the machine learning has been trained to find by searching the image. The geometric shape the machine learning is using to search the image may be at least one of: a rectangle, a square, a circle, a triangle or a polygon. Portions of the pixels from the image portion bounded by the geometric shape as the geometric shape is moved across the image may be sent to the machine learning to see if a desired pattern is identified. This means a step-wise search may be used across the image for the desired pattern using windowing. For instance, the machine learning may be regression, pattern recognition, a convolutional neural network (CNN) or a deep neural network (DNN) that is used to find a defined pattern in an image. Any type of object detection, image segmentation, machine learning, pattern recognition methods, edge detection methods, filtering, or feature extraction methods can be used to identify the priority part(s) of a message.

The machine learning can identify a bounding box containing the pattern being detected in an image, and the desired amount of security and/or compression can be applied to data in the bounding box. Image data or image portions that are of lower priority or of little interest may have little or no security applied. In one example, if a bounding box is identified around a vehicle, that box might get 100% security and the rest of the image may get 20% security. If the data connection is detected as currently degrading, then the amount of security applied the priority portion of the image may drop to 80%, 50%, 30% or another desired amount of probability provided by a security method to maintain data security across the slower connection. If the connection is currently improving, then the amount of security or compression may be improved in proportion to the additional amount of bandwidth that is available. The sending node may have the capability to automatically detect and adjust as the bandwidth improves or degrades due to physical conditions or traffic routing.

The remainder of the image 620 in FIG. 6 may be sent with a lower security than the priority portion of the image, and the lower security may be at least one of: a reduced security level of encryption, the lower priority portion is sent unchanged, or the remainder of the image is not sent.

The ability to detect patterns in message data can be extended to fully homomorphic encrypted (FHE) data. In this configuration, homomorphic encryption can first be applied on the data. Then the encrypted data can be processed by the machine learning services, and the desired patterns may be identified using the machine learning when processing the FHE data. This means a boundary box can be found in data of interest even after homomorphic encryption has been applied to the message data (e.g., image data). For example, even if the entire image is homomorphically encrypted, the machine learning can still identify a bounding box for a pattern of interest and then only the data in that bounding box may be sent across the limited bandwidth communication link. The remainder of the image may either be compressed or not sent to the receiving node. Using FHE may change the order of operations but the FHE data may be normally decrypted at the receiving node.

Figure 7:
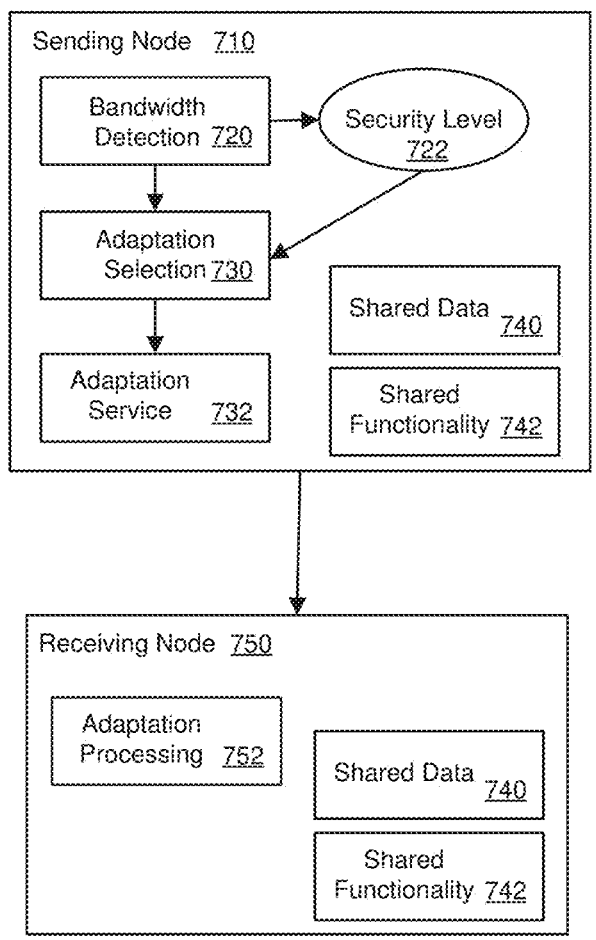
FIG. 7 illustrates an example block diagram of a system for communication adaption on a constrained bandwidth link.

FIG. 7 illustrates an example block diagram of a system for communication adaption on a constrained bandwidth link. This includes the ability to select one or more protocol resources from a group of resources that can be applied when a constrained bandwidth link for a computer network is detected. The speed of the link for the computer network may also determine in part which protocol resources are selected to be applied to data blocks sent over the computer network.

The system may detect the constrained bandwidth link of a computer network across which data blocks are to be sent between a sending node 710 and a receiving node 750. A bandwidth detection service 720 may be used to identify the constrained bandwidth link. An adaptation selection service 730 may be used to select a resource adaptive protocol from at least one of: shared data knowledge, adaptive authentication codes or adaptively applied encryption or compression. This allows the technology to pick and choose the adaptive security and/or authentication pieces that are needed. The selected resource adaptive protocol(s) may be to be applied to data blocks or data packets based in part on detecting the existence of a constrained bandwidth link or detecting a speed of the constrained bandwidth link. Alternatively, the user may be able to select what part of the security and/or authentication they want, which will not overwhelm the communication link.

The adaptation protocols may be applied dynamically. The bandwidth detection service 720 may detect the amount of bandwidth available over time using periodic sampling. For example, the bandwidth speed may be checked every minute, every 15 minutes, every session, or every day. The types and number of resource adaptive protocols that may be applied on the constrained bandwidth link can increase when there is less bandwidth available or decrease when there is more bandwidth available. If the connection is tested and relatively less bandwidth is available, then more resource adaptive protocols may be applied starting with the protocols that are most important to security or authentication. Alternatively, resource adaptive resource protocols may be turned off when the speed of the connection is relatively high or so low that no adaptive resource protocols can be supported. The system may also be trained over time regarding tuning between how much bandwidth is available and how secure the end users or application want the communication link to be, and the system may adjust accordingly.

An example of a resource adaptive protocol may be reducing data sent between the sending node 710 and the receiving node 750 by not sending shared data 740. For example, the shared data between both the sending node 710 and the receiving node 750 may be packet header information or port information that is already known by the sending node 710 and the receiving node 750 in advance. In contrast, IPSec has certain headers that must be send but it may be unnecessary to send all the data contained in such headers across the communication link (e.g., water, air or wire), if both nodes know the information that would otherwise be sent in data packet headers in advance.

As a more specific example, if both a sending node and receiving node know the application type and/or know what type of data they are sending, then the port number may not have to be shared in the IP header of IP data packets and this field may be a 16 bit field. Accordingly, the nodes do not have to communicate the port but they can be set to a port in advance which may save 16 bits in data packets that would have otherwise contained this information.

Another resource adaptive protocol may be using knowledge of shared functionality 742 between the sending node and the receiving node. For example, the shared functionality may be time synchronization between the sending node and the receiving node. The time synchronization may be used to select a seed to generate the same encryption key (e.g., a symmetric key) that is shared data for both the sending node 710 and receiving node 750. In previous encryption schemes, an initialization vector may be sent between a sending node and receiving node, but if there is time synchronization between the nodes, then the nodes may use a time stamp that they both have within a certain time tolerance. This may provide a data transmission savings by providing a shared seed for the keys and can save sending the initialization vector.

Similarly, the key can be changed at periodic intervals but no data will need to be sent. Instead, both nodes will know when the new key is going to be used and a new key can be separately generated at each node without additional communications between the nodes. Thus, the nodes may synchronize the time frames for rotating the keys rather than communicate that across the constrained bandwidth link.

The resource adaptive protocol can be applied at a defined security level 722 to the data blocks by an adaptation service 732. The data blocks can then be sent across the constrained bandwidth link to the receiving node 750 and the data blocks may be processed by the adaptation processing 752 on the receiving node 750.

Figure 8:
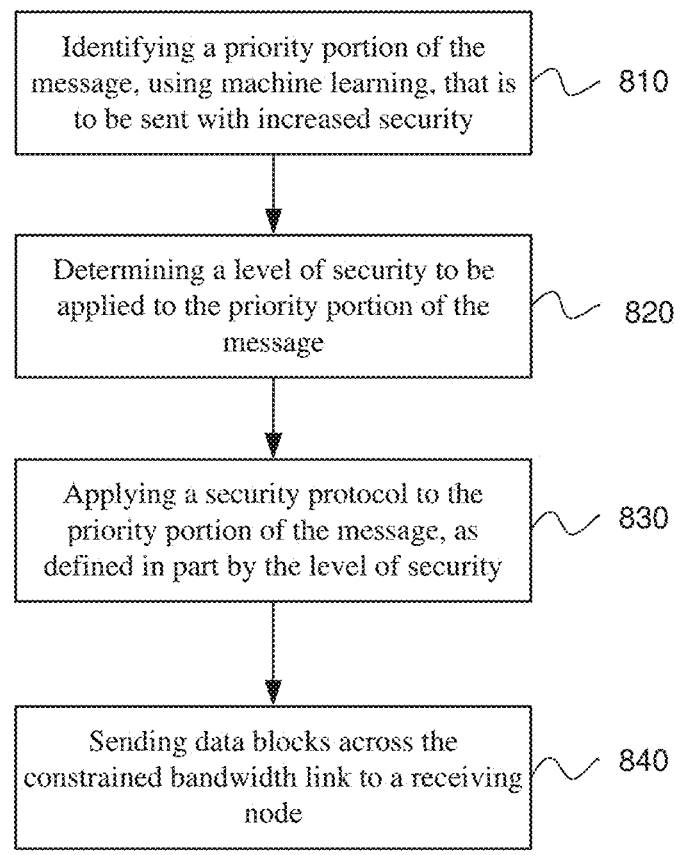
FIG. 8 is a flowchart illustrating an example of a method for applying security to a message to be sent over a constrained bandwidth link.

FIG. 8 is a flowchart illustrating an example of a method for applying security to a message to be sent over a constrained bandwidth link. Initially, the constrained bandwidth link for a computer network across which the data blocks are to be sent may be detected. The constrained bandwidth link may be between a sending node and the receiving node.

The method may include the operation of identifying a priority portion of the message, using machine learning, as in block 810. The priority portion of the message is to be sent with increased security as compared with a remainder of the message.

A level of security may be determined and applied to the priority portion of the message, as in block 820. The level of security may be a set level of security or encryption that is applied. The priority portion of the image may be defined by boundary box or a geometric shape where the pattern is found by the machine learning, which has been trained to find the pattern by searching the image. While the machine learning may identify a boundary box, the geometric shape which is used to find or identify the pattern may be: a rectangle, a circle, a square, a triangle, a polygon or another defined region. Alternatively, the level of security to be applied to the priority portion of the message may be determined based in part on a speed of the constrained bandwidth link. The machine learning used may be regression, pattern recognition, a convolutional neural network (CNN) or a deep neural network (DNN) or other types of machine learning which may identify a pattern in an image data, audio data or text data.

A security protocol may then be applied to the priority portion of the message, as defined in part by the level of security, as in block 830. In one configuration, the security protocol may be counter mode encryption or block cipher mode encryption. Alternatively, the security protocol applied may be encryption that has a defined encryption strength (e.g., a defined encryption key size).

Data blocks with the priority portion of the message or the entire message may be sent across the constrained bandwidth link to a receiving node, as in block 840. The message may be image data or character encoded data, such as text. In addition, the message may be audio data, video data, data for a database or graphical display data. In one example, the remainder of the image may be sent with a lower security than the priority portion of the image, and the lower security may be at least one of: a reduced security level of encryption, compression, lossy compression, not applying any security or the remainder of the image is not sent at all.

Figure 9:
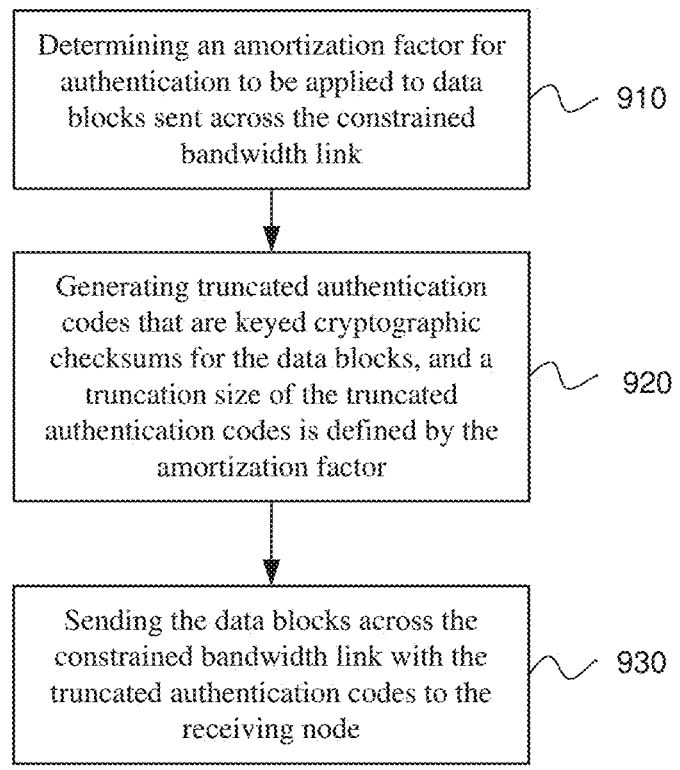
FIG. 9 is a block diagram illustrating an example of a method for applying amortized authentication on a constrained bandwidth link.

FIG. 9 is a block diagram illustrating an example of a method for applying amortized authentication on a constrained bandwidth link. The method may include determining an amortization factor for authentication to be applied to data blocks sent across the constrained bandwidth link, as in block 910. The amortization factor to be applied may be an amortization factor set through a user interface control or based on a detected bandwidth of the constrained bandwidth link. For example, a lower available bandwidth may result in an increased amortization factor (e.g., 10, 20, or 100, where the number is the number of blocks the truncated authentication code is spread across) and a higher amount of available bandwidth may result in lower amortization factor (e.g., 3 or 5). In the situation where the amount of bandwidth is being used to determine the amortization factor, then the constrained bandwidth link of a computer network, across which data blocks are to be sent, may be detected between a sending node and a receiving node. Alternatively, an amortization factor to be applied may be set in advance for both the sending node and receiving node.

The truncated authentication codes that are generated may be keyed cryptographic checksums for the data blocks, as in block 920. A truncation size of the truncated authentication codes may be defined by the amortization factor. A truncated authentication code can be generated for at least one current data block and a truncated authentication code for at least one previous data block. The truncated authentication code may have a reduced bit length for a checksum of at least one current data block and a prior truncated authentication code for a previous data block. For example, a full MAC code for a 100 bit block maybe greater than 100 bits but the truncated authentication code may be set at 8 bits or another number of bits.

The data blocks may be sent across the constrained bandwidth link with the truncated authentication codes to the receiving node, as in block 930. An authentication probability threshold may be set at which the data blocks being received across the constrained bandwidth link are deemed to be authentic. An authentication probability threshold may be reached when a defined number of truncated authentication codes (or bits) are received and validated at the receiving node. Satisfaction of the authentication probability threshold, for truncated authentication codes received and validated, may indicate that the data blocks have not been modified over the number of data blocks received. Once the authentication probability threshold has been reached, the data blocks may be marked as authentic to enable a user or application to use or view the data blocks. Data from the data blocks sent over the constrained bandwidth link may be presented for viewing at the receiving node after the data blocks are deemed to be authentic.

Figure 10:
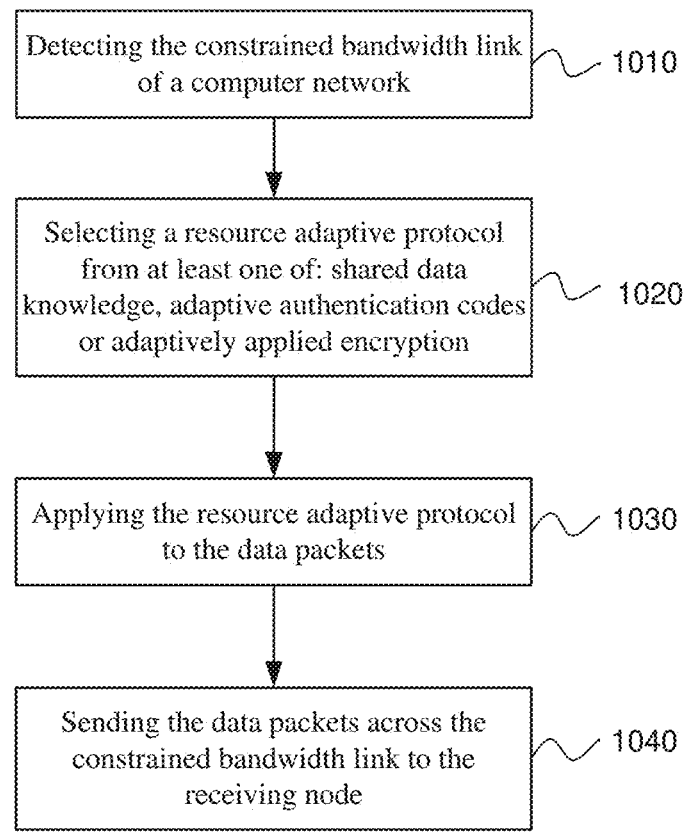
FIG. 10 is a flowchart illustrating an example of a method for communication adaption on a constrained bandwidth link.

FIG. 10 is a flowchart illustrating an example of a method for communication adaption on a constrained bandwidth link. The method may include detecting the constrained bandwidth link of a computer network across which data blocks are to be sent between a sending node and a receiving node, as in block 1010.

A resource adaptive protocol may be selected from at least one of: shared data knowledge, adaptive authentication codes or adaptively applied encryption, which may be applied to data blocks or data packets based in part on detecting the constrained bandwidth link, as in block 1020. In the case of shared data knowledge, the amount of bandwidth used may be reduced by reducing the data sent between the sending node and the receiving node. More specifically, the nodes may not send shared data or may use knowledge of shared functionality resulting in shared data between the sending node and the receiving node to reduce the data sent. One example of shared data that may not be sent between the sending node and the receiving node is the shared data that would otherwise be sent as packet header information or port information that is known by the sending node and receiving node in advance. An example of the shared functionality is time synchronization between the sending node and the receiving node that may result in a shared seed for generating symmetric encryption keys.

In the situation of selecting a resource adaptive protocol that is adaptive authentication codes, the adaptive authentication codes can be applied to data blocks to be sent. More specifically, an amortization factor may be determined for authentication to be applied to data blocks to be sent across the constrained bandwidth link. Truncated authentication codes may be generated from the keyed cryptographic checksums for the data blocks. A truncation size for the truncated authentication codes may be defined by the amortization factor determined for the constrained bandwidth link.

In the situation of selecting a resource adaptive protocol that is adaptively applied encryption, the adaptively applied encryption may be applied by identifying a priority portion of an image, video, audio or text using machine learning that is desired to be sent with increased security, as compared with a remainder of the image. Then security protocol, such as reduced security encryption, can be applied to the priority portion of the image which is to be sent in data packets over the constrained bandwidth link.

The resource adaptive protocol may be applied to the data packets, as in block 1030. The data packets may then be sent across the constrained bandwidth link to the receiving node, as in block 1040.

This technology enables a constrained bandwidth link or a low bandwidth channel to have authentication and security on the constrained communication link(s) even if the security is not the highest level of security. However, the sending node and receiving node may still be able to send data that can be used by the applications or users at the receiving node. Accordingly, applying the resource adaptive protocols can reduce the amount of overhead applied to security as much as possible. In some cases, the end application or the user can adapt the resource adaptive protocols based on their needs. For example, the strength of the encryption applied or how fast a message is authenticated may vary.

To reiterate and summarize, the present technology can use certain information that is known in advance such as: time synchronization between a sending and receiving node or the type of application being used and can save the bytes used in typical packet headers to reduce data sent. In addition, this technology can amortize the authentication codes over time, and then accumulate the confidence data for the authentication codes on the receiving node until a confidence threshold is reached. Furthermore, this technology may use machine learning to identify the more important parts of the message and apply higher levels of security and/or compression to higher priority parts of a message.

Providing some security over a reduced bandwidth link is valuable because the sending and receiving nodes may be able to use a communication link that might be otherwise be unusable due to security reasons. In addition, providing limited security is better than no security. In most information technology circumstances, a sender would not risk sending data unless the sender knows the data is 100% secure. In a limited bandwidth circumstance, then if the sender of the message can reach a 60% or 80% level of security, the message may be sent. Usually security is thought of in terms of all or nothing but providing intermediate levels of security may allow a limited bandwidth link to be used more securely. For example, a limited bandwidth link may be especially important in an emergency situation, a rescue operation, a harsh environment (e.g., underwater or in a cave) or in war time communications.

Figure 11:
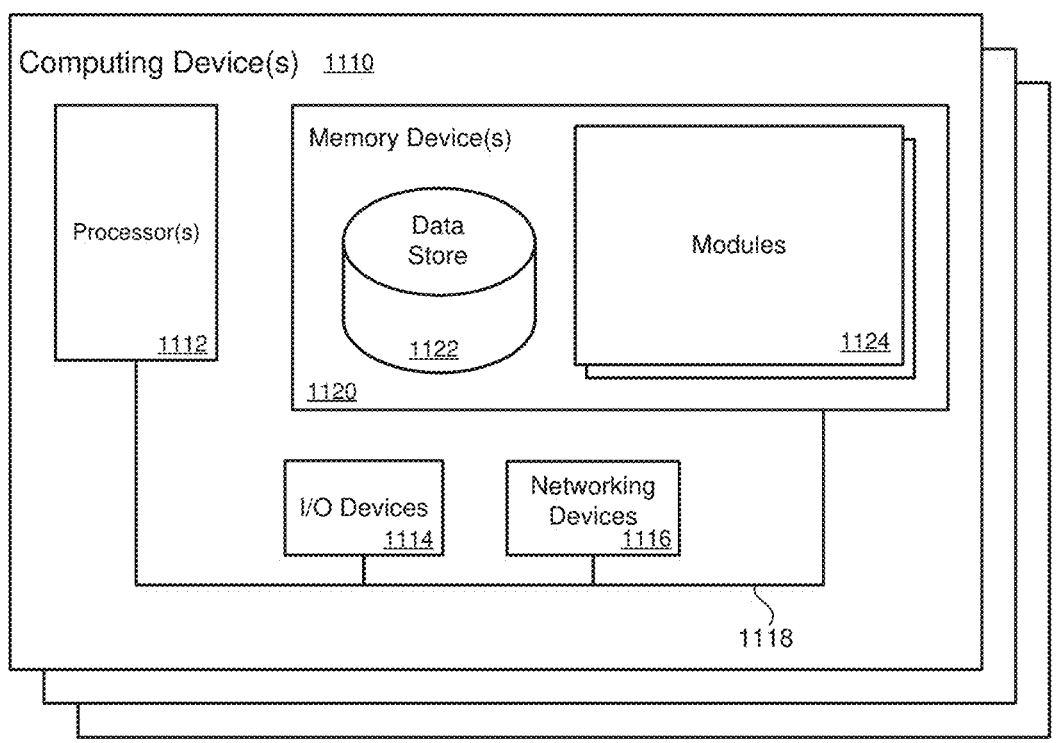
FIG. 11 is a block diagram that provides an example illustration of a computing device that may be employed in the present technology.

FIG. 11 illustrates a computing device 1110 on which modules of this technology may execute. The computing device 1110 is illustrated on which a high level example of the technology may be executed. The computing device 1110 may include one or more processors 1112 that are in communication with memory devices 1120. The computing device may include a local communication interface 1118 for the components in the computing device. For example, the local communication interface may be a local data bus and/or any related address or control busses as may be desired.

The memory device 1120 may contain modules 1124 that are executable by the processor(s) 1112 and data for the modules 1124. The modules 1124 may execute the functions described earlier. A data store 1122 may also be located in the memory device 1120 for storing data related to the modules 1124 and other applications along with an operating system that is executable by the processor(s) 1112.

Other applications may also be stored in the memory device 1120 and may be executable by the processor(s) 1112. Components or modules discussed in this description that may be implemented in the form of software using high programming level languages that are compiled, interpreted or executed using a hybrid of the methods.

The computing device may also have access to I/O (input/output) devices 1114 that are usable by the computing devices. An example of an I/O device is a display screen that is available to display output from the computing devices. Other known I/O device may be used with the computing device as desired. Networking devices 1116 and similar communication devices may be included in the computing device. The networking devices 1116 may be wired or wireless networking devices that connect to the internet, a LAN, WAN, or other computing network.

The components or modules that are shown as being stored in the memory device 1120 may be executed by the processor 1112. The term "executable" may mean a program file that is in a form that may be executed by a processor 1112. For example, a program in a higher level language may be compiled into machine code in a format that may be loaded into a random access portion of the memory device 1120 and executed by the processor 1112, or source code may be loaded by another executable program and interpreted to generate instructions in a random access portion of the memory to be executed by a processor. The executable program may be stored in any portion or component of the memory device 1120. For example, the memory device 1120 may be random access memory (RAM), read only memory (ROM), flash memory, a solid state drive, memory card, a hard drive, optical disk, floppy disk, magnetic tape, or any other memory components.

The processor 1112 may represent multiple processors and the memory 1120 may represent multiple memory units that operate in parallel to the processing circuits. This may provide parallel processing channels for the processes and data in the system. The local interface 1118 may be used as a network to facilitate communication between any of the multiple processors and multiple memories. The local interface 1118 may use additional systems designed for coordinating communication such as load balancing, bulk data transfer, and similar systems.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A method for applying security to a message to be sent over a constrained bandwidth link, comprising:
   identifying a priority portion of the message, using machine learning, that is to be sent with increased security as compared with a remainder of the message;
   determining a level of security to be applied to the priority portion of the message;
   applying a security protocol to the priority portion of the message, as defined in part by the level of security;
   sending data packets for the message across the constrained bandwidth link to a receiving node;
   detecting the constrained bandwidth link for a computer network across which the data packets are to be sent between a sending node and the receiving node; and
   determining the level of security to be applied to the priority portion of the message based in part on a speed of the constrained bandwidth link.

2. The method as in claim 1, wherein the security protocol is encryption having a defined encryption strength.

3. The method as in claim 1, wherein the security protocol is counter mode encryption or block cipher mode encryption.

4. The method as in claim 1, wherein the message is an image.

5. A method for applying security to a image to be sent over a constrained bandwidth link, comprising:
   identifying a priority portion of the image, using machine learning, that is to be sent with increased security as compared with a remainder of the image;
   determining a level of security to be applied to the priority portion of the image;
   applying a security protocol to the priority portion of the image, as defined in part by the level of security; and
   sending data packets for the image across the constrained bandwidth link to a receiving node;
   wherein the priority portion of the image is defined by a geometric shape containing a pattern the machine learning has been trained to find by searching the image.

6. The method as in claim 5, wherein the geometric shape is at least one of: a rectangle, a circle, a square, a triangle or a polygon.

7. The method as in claim 5, wherein the remainder of the image is sent with a lower security than the priority portion of the image, and the lower security may be at least one of: a reduced security level of encryption, compression, no security, or the remainder of the image is not sent.

8. The method as in claim 1, wherein the machine learning is regression, pattern recognition, a convolutional neural network (CNN) or a deep neural network (DNN) capable of identifying a pattern in an image.

9. A system for applying security to a message to be sent over a constrained bandwidth link, comprising:
   at least one processor; and
   a memory device including instructions that, when executed by the at least one processor, cause the system to:
   detect the constrained bandwidth link of a computer network across which data packets are to be sent between a sending node and a receiving node;
   identify a priority portion of the message, using machine learning, that is desired to be sent with increased security as compared with a remainder of the message;
   determine a level of security to be applied to the priority portion of the message;
   apply a security protocol defined in part by the level of security to the priority portion of the message; and
   send the data packets across the constrained bandwidth link to the receiving node;
   wherein the security protocol is counter mode encryption or block cipher mode encryption.

10. The system as in claim 9, wherein the message is an image.

11. The system as in claim 10, wherein the priority portion of the image is defined by a geometric shape containing a pattern the machine learning has been trained to find by searching the image.

12. The system as in claim 11, wherein the remainder of the image is sent with a lower security than the priority portion of the image, and the lower security may be at least one of: a reduced security level of encryption, compression, no security or the remainder of the image is not sent.

13. A method for communication adaption on a constrained bandwidth link, comprising:

detecting the constrained bandwidth link of a computer network across which data packets are to be sent between a sending node and a receiving node;

selecting a resource adaptive protocol from at least one of: shared data knowledge, adaptive authentication codes or adaptively applied security, to be applied to data packets based in part on detecting the constrained bandwidth link;

applying the resource adaptive protocol to the data packets; and sending the data packets across the constrained bandwidth link to the receiving node; and reducing data sent between the sending node and the receiving node by not sending shared data knowledge or by using knowledge of shared functionality between the sending node and the receiving node.

14. The method as in claim 13, wherein the shared data is packet header information or port information that is known by the sending node and receiving node in advance.

15. The method as in claim 13, wherein the shared functionality is time synchronization resulting in a shared timestamp between the sending node and the receiving node.

16. A method for communication adaption on a constrained bandwidth link, comprising:

detecting the constrained bandwidth link of a computer network across which data packets are to be sent between a sending node and a receiving node;

selecting a resource adaptive protocol from at least one of: shared data knowledge, adaptive authentication codes or adaptively applied security, to be applied to data packets based in part on detecting the constrained bandwidth link;

applying the resource adaptive protocol to the data packets; and sending the data packets across the constrained bandwidth link to the receiving node;

determining an amortization factor for authentication to be applied to data packets to be sent across the constrained bandwidth link; and generating truncated authentication codes that are keyed cryptographic checksums for the data packets, and a truncation size for the truncated authentication codes is defined by the amortization factor determined for the constrained bandwidth link.

17. The method as in claim 13, further comprising:

identifying a priority portion of an image using machine learning that is desired to be sent with increased security as compared a remainder of the image; and applying a security protocol to the priority portion of the image which is to be sent in data packets over the constrained bandwidth link.

* * * * *